(12) United States Patent
Spangenberg et al.

(10) Patent No.: US 6,365,906 B1
(45) Date of Patent: Apr. 2, 2002

(54) METHOD AND APPARATUS FOR DETECTING AND EJECTING MISALIGNED CONTAINERS

(75) Inventors: Thomas Spangenberg, Baltimore; Thomas Lamb, Silver Spring, both of MD (US)

(73) Assignee: AMBEC, Incorporated, Owings Mills, MD (US)

( * ) Notice: Subject to any disclaimer, the term of this patent is extended or adjusted under 35 U.S.C. 154(b) by 0 days.

(21) Appl. No.: 09/359,431

(22) Filed: Jul. 22, 1999

(51) Int. Cl.⁷ .................... G01N 21/86; G01N 21/00
(52) U.S. Cl. ............... 250/559.3; 250/223 B; 250/559.29; 356/239.4; 356/240.1
(58) Field of Search ............... 250/223 B, 221, 250/222.1, 223 R, 559.29, 559.3; 356/239.4, 239.1, 240.1, 237.1; 209/522, 523, 524, 525, 526, 527, 528

(56) References Cited

U.S. PATENT DOCUMENTS

| | | | |
|---|---|---|---|
| 3,433,966 A | 3/1969 | Letch et al. | |
| 3,506,840 A | 4/1970 | Fink | |
| 3,708,679 A | 1/1973 | Stock et al. | |
| 3,710,922 A | 1/1973 | Lanphere et al. | |
| 3,724,641 A | 4/1973 | Wainwright et al. | |
| 3,730,325 A | 5/1973 | Goodwin | |
| 3,827,812 A | * 8/1974 | Heimann | 356/240 |
| 4,253,573 A | * 3/1981 | Dubberly et al. | 209/525 |
| 4,259,571 A | * 3/1981 | Dubberly | 209/524 |
| 4,354,865 A | 10/1982 | Poad et al. | |
| 4,421,542 A | * 12/1983 | Poad et al. | 209/525 |
| 4,494,656 A | * 1/1985 | Shay et al. | 209/524 |
| 4,722,169 A | * 2/1988 | DeSantis | 53/494 |
| 5,531,310 A | * 7/1996 | Itoh | 198/395 |
| 6,016,200 A | * 1/2000 | Sjostrand | 356/375 |

* cited by examiner

Primary Examiner—Frank G. Font
Assistant Examiner—Roy M. Punnoose
(74) Attorney, Agent, or Firm—Crowell & Moring LLP

(57) ABSTRACT

The invention is directed to an apparatus for detecting and ejecting fallen containers on a conveyor line. The detecting apparatus includes at least three sensors arranged beside the conveyor system. Two of the sensors are positioned to detect the top of a container and a third sensor is positioned to detect the bottom of the container. When a container is judged to be fallen on the conveyor line, a control system sends a signal to an ejector apparatus to remove the fallen container from the conveyor line.

29 Claims, 4 Drawing Sheets

METHOD AND APPARATUS FOR DETECTING AND EJECTING MISALIGNED CONTAINERS

FIELD OF THE INVENTION

The present invention relates to a method and apparatus for detecting or sensing the position of a container on a conveyor line used in a manufacturing facility that conveys large numbers of containers over short periods of time. More particularly, the present invention is directed to a method and apparatus for detecting whether a container on a conveyor line is misaligned or fallen, and if so, selectively ejecting such container.

BACKGROUND AND SUMMARY OF THE INVENTION

The present invention relates to a system for detecting misaligned or fallen objects among other properly aligned objects on a conveyor line. Once an object has been detected as being misaligned or fallen, an ejector arrangement is provided to quickly remove the fallen object.

In many different types of manufacturing facilities, objects, and more particularly containers, are transported along conveyor lines to various processing stations. Normally, the containers are placed on a conveyor in a predetermined, upright position. That is, the container bottom rests on the conveyor when the container is in the upright position. Occasionally, the container may fall or be misaligned on the conveyor. For the purposes of this invention fallen or misaligned containers will be referred to generally as "down" containers. Such down containers may result in jamming of the other containers on the line or may interfere with processing or other material handling operations with upright containers. Accordingly, it is important to detect and remove down containers as quickly as possible before they reach critical processing areas on the conveyor line.

Other types of container detection and ejection systems have been proposed. U.S. Pat. Nos. 3,506,840 to Fink; 4,354,865 to Poad et al.; and 4,494,656 to Shay et al. disclose down-ware rejector systems for removing fallen containers on a conveyor line. These patents teach arrangements for detecting fallen bottles relying on single sensor, such as a reflected light beam or sonic wave. The angle of incidence of the reflected light beam or sonic wave from a fallen bottle is different from an upright bottle. When a fallen bottle is detected, it is ejected using a plunger arrangement.

U.S. Pat. No. 3,710,922 to Lanphere teaches the use of a fiber optic system for detecting misorientation of an object on a conveyor. A light beam is directed toward the object from a fiber optic sensor. If the object has fallen or is misaligned on the line, the light beam will be reflected at a different angle than that from an upright and correctly aligned object. When the system detects a fallen object, it is ejected.

U.S. Pat. No. 3,433,966 to Letch et al. teaches a system using a single top sensor. When a sensor senses a fallen bottle, it actuates an alarm or a device for righting the fallen bottle. While this patent shows several sensors disposed above the containers, each is sensing a fallen bottle in a particular lane. Thus, it teaches the use of a single sensor.

Each of these prior systems suffers various problems. All of the systems rely on a single sensor to determine the orientation of the object on a conveyor line. The use of a single sensor may lead to erroneous detection results based on the orientation or shape of the container. In addition, the detection systems of Fink, Poad, Shay and Lanphere all depend on container geometry to produce a specific angle of reflection. These systems require expensive and complex signal processing circuitry to determine container status.

An object of the invention is to solve the above mentioned disadvantages and therefore to provide an improved container orientation detection system. To achieve these and other advantages, the present invention is directed to an apparatus for detecting and ejecting down containers on a conveyor line that is adapted to move a plurality of containers, each having a top and a bottom. According to a preferred embodiment of the invention, at least three sensors are arranged beside the conveyor, at least two of the sensors being positioned to detect the top of the containers and at least one of the sensors being positioned to detect the bottom of the containers when the containers are in an upright position. Preferably, the sensors are non-contact sensors, although the invention contemplates any suitable type of sensor well-known in the out. Most preferred are optical type sensors, including but not limited to, a radiant light source and photocell, fiber optics or camera type devices. The sensors may also be sonic type sensors. Depending on the configuration of the conveyor line and/or the type of containers, there could be a mix of different types of sensors. The sensors produce a signal which represents the presence or absence of a container portion.

Suitable sensors are photoelectric retro-reflective, photoelectric polarized retro-reflective, photoelectric diffuse and photoelectric polarized diffuse sensors. Additionally, transmitted beam, infrared fiber optic and plastic fiber optic sensors may be used.

A control system is provided for determining whether said containers are down based on the signals produced from the sensors. The control system is preferably a stand alone electronic control apparatus. However, any type of electronic control apparatus that is capable of signal processing may be used.

The present invention also includes an ejector to remove any fallen containers detected on the conveyor. The ejector is actuated by a control signal generated by the control system, based on signals output from the sensors. For down containers that are empty, the ejector is preferably an air jet that blows the fallen container off the conveyor. For heavier, such as full, containers, the preferred ejector is a ram-type pusher. Other well-known types of ejectors are also contemplated, such as robotics. Other types of contemplated ejectors are pneumatic cylinders, pneumatic actuators and solenoid actuated rams.

The present invention is also directed to a method for removing down containers on a conveyor line. The method includes the step of detecting the presence or absence of the tops of containers with at least two sensors as the containers move along on a conveyor. The method also includes the step of detecting the bottoms of containers with at least one sensor. A further step of determining whether a container is in an upright or fallen position based on signals output from the sensors is also included. The method includes a further step of removing any fallen containers based on the determination of whether the container has fallen.

BRIEF DESCRIPTION OF THE DRAWINGS

Other objects, advantages and novel features of the present invention will become apparent from the following detailed description of the invention when considered in conjunction with the accompanying drawings, wherein.

DESCRIPTION OF THE PREFERRED EMBODIMENTS

The invention and advantageous details will now be explained more fully with reference to exemplary embodiments.

Figure 1:
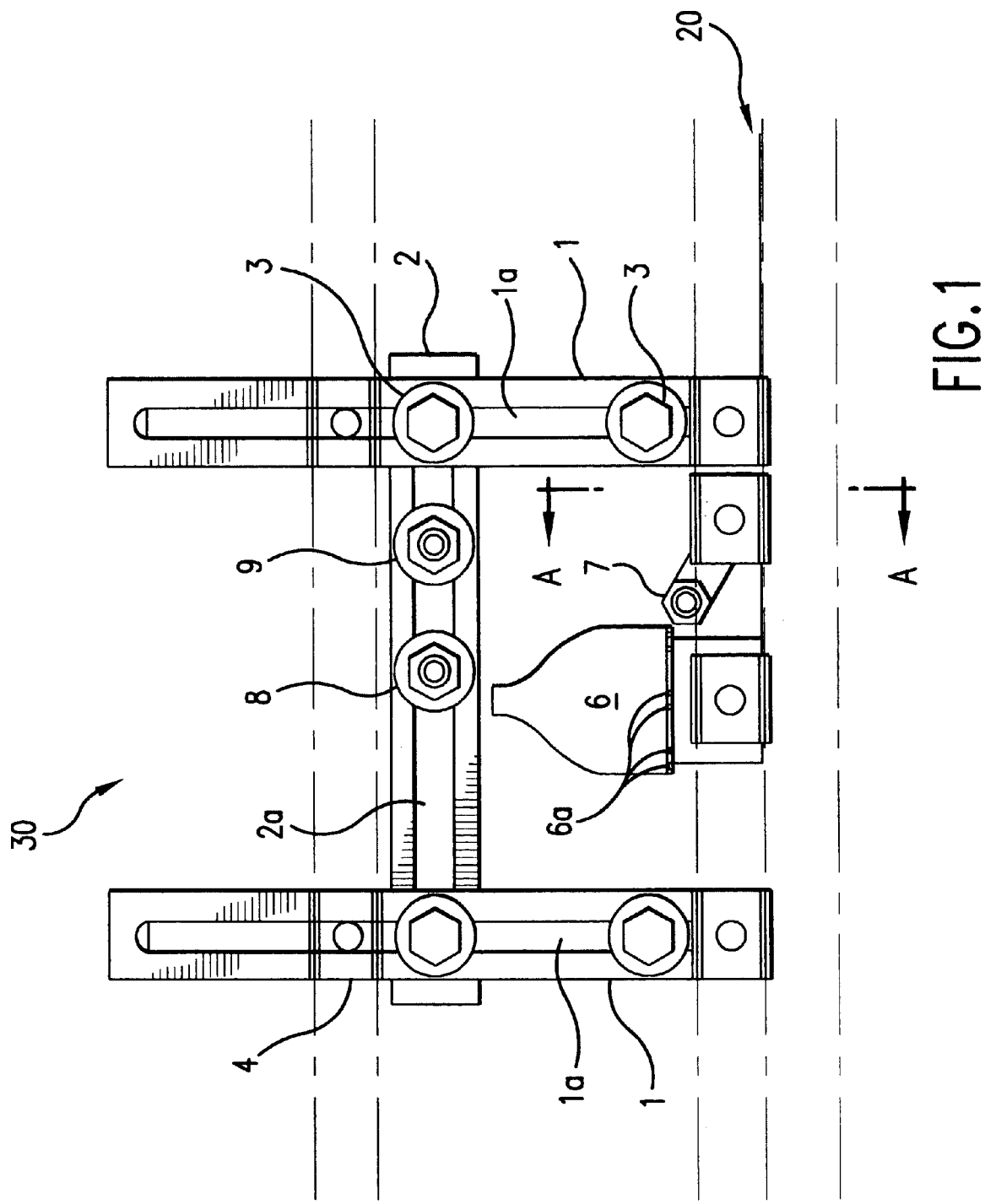
FIG. 1 is schematic front view showing a detecting apparatus according to a first embodiment of the invention.

FIG. 1 illustrates a first embodiment according to the present invention. An apparatus 30 is illustrated for detecting and ejecting down containers (not shown) on a conveyor line. A conveyor 20 is adapted to transport containers from one area of a processing line to another. Generally the containers are in an upright position on the conveyor, that is, the container bottom rests on the conveyor 20. Containers may be arranged in a predetermined pattern on the conveyor. Containers on the conveyor are moved past a detecting apparatus 30.

Detecting apparatus 30 is made up of an adjustable frame having vertical frame members 1 and horizontal support 2. Horizontal support 2 is adjustably connected to frame member 1 by a pair of bolts 3. Horizontal support 2 can be adjusted in the vertical direction within slots 1a. The vertical alignment allows for sensing containers having different height dimensions. Horizontal support 2 may be configured with an adjustment slot 2a. A pair of sensors 8, 9 are positioned on support 2. If support 2 is provided with slot 2a, the sensors may be mounted within slot 2a. The position of sensors 8 and 9 can be adjusted along the length of support 2, and are maintained in position by a pair of nuts that are not shown. The dimension between sensors 8 and 9 can also be set at a predetermined distance to takes into account the size and shape of the container being absorbed. Sensors 8 and 9 are preferably optical sensors. They can be in the form of a fiber optic sensor, a radiant light source and photocell, camera system or some other type of optical apparatus. Sensors 8 and 9 may also be sonic or pressure-type sensors. While, in the preferred embodiment, the sensors are mounted on a frame as shown, any suitable mounting structure can be used.

A third sensor 7 is positioned below sensors 8 and 9. Sensor 7 is positioned close to the bottom of the containers as they move past on conveyor 20. Sensor 7 is preferably the same type of sensor as 8 and 9, preferably being an optical sensor. Sensor 7 is adapted to sense the presence of the bottom of the container as it moves on conveyor 20.

According to a preferred embodiment of the invention, at least three sensors are used, two of which detect the tops of containers and the third for detecting the bottoms of containers on conveyor 20. However, additional sensors could also be used without deviating from the invention.

Figure 2:
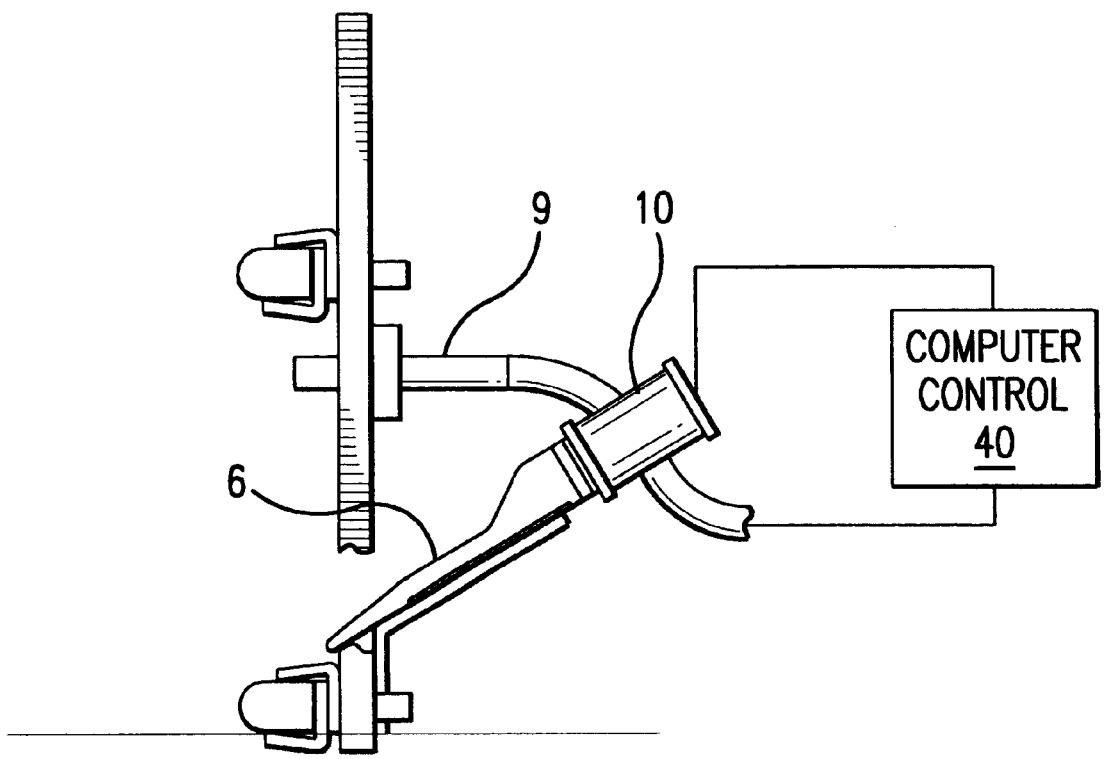
FIG. 2 is schematic side view of the embodiment of FIG. 1 showing the ejector and upper sensor.

FIG. 1 illustrates a sensor arrangement for detecting the presence of empty containers which have fallen on conveyor 20. Associated with the detection device 30 is an ejector generally shown as reference 6. The ejector for the empty container system is preferably an air blower-type device. Air nozzle 6 is provided with a plurality of openings 6a along the bottom thereof. The inlet end of air nozzle 6 is connected a source of air flow. The air source could be a compressed air blower 10 as shown in FIG. 2.

In operation, as containers on conveyor 20 move past sensors 7, 8 and 9, signals are generated. As shown in FIG. 2, the signals from each sensor are sent to an off-line control 40 which is preferably a stand alone electrical processing unit. One advantage of the invention is that a computer (or programmable logic controller) is not necessary because time-delay logic for the sensors is not needed. If the bottom sensor detects a container and both the top sensors do not, the container is ejected. This is accomplished through relay, relay-style, or electrical transistor hardware. Notwithstanding, a computer or programmable logic controller could be used without deviating from the invention.

Unit 40 processes signals from sensors 7, 8 and 9 and determines whether the signals represent a down container or an upright container. If unit 40 determines that the container is down, an ejection signal is generated. The ejection signal activates air blower device 10 which generates a puff of air through openings 6a in the bottom of air nozzle 6. The air from air nozzle 6 will eject the down container from the conveyor apparatus.

Figure 3:
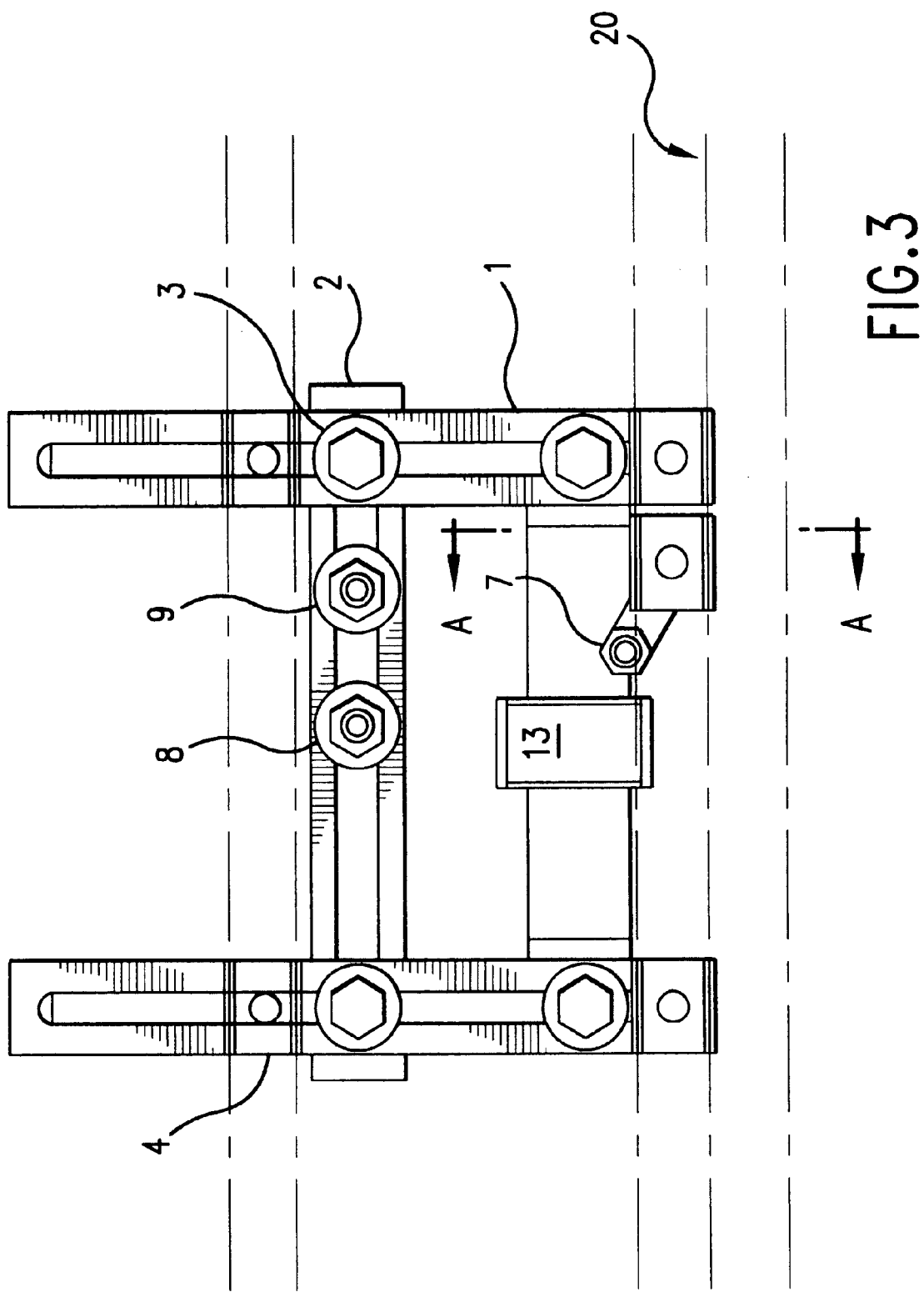
FIG. 3 is schematic front view showing a detecting apparatus according to a second embodiment of the invention.
Figure 4:
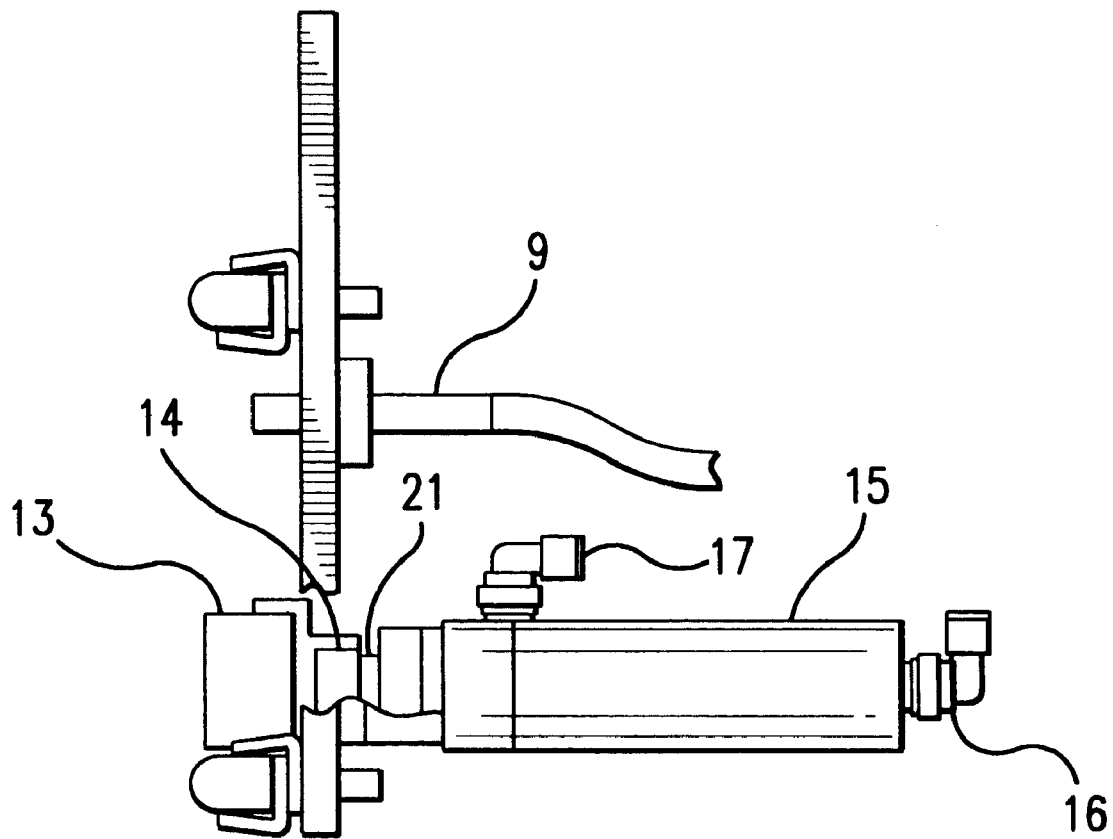
FIG. 4 is schematic side view of the embodiment of FIG. 3 showing the ejector and upper sensor.

FIGS. 3 and 4 illustrate a second embodiment according to the present invention. In this embodiment, the containers that travel along conveyor 20 are full or are inherently heavy. The sensor structure and apparatus remain the same as in the previous embodiment. However, the ejector device shown in FIG. 3 preferably comprises a pusher having a pusher face 13. As seen in FIG. 4, pusher face 13 is attached to a pusher mount 14. Pusher mount 14 is connected via arm 21 to cylinder 15. Cylinder 15 has a pair of connectors 16 and 17 for inlet and outlet of a fluid. Preferably cylinder 15 is a pneumatic cylinder or a solenoid. However, a hydraulic cylinder may also be used.

In operation, as with the previous embodiment, upon receiving signals generated from sensors 7, 8 and 9, unit 40 will generate a signal which controls a cylinder operating device (not shown). The cylinder operating device will force fluid into connector 16 which, through a piston arrangement contained in cylinder 25 causes arm 21 to extend transversely to conveyor 20. Pusher face 13 will thereby eject the full down container.

The foregoing disclosure has been set forth merely to illustrate the invention and is not intended to be limiting. For instance, the ejector could be an electronically controlled robotic device that would remove the down container. In addition, the ejector arrangements of FIGS. 1 and 3 could be interchangeable between full and empty containers. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for detecting and ejecting down containers on a conveyor comprising:

at least three sensors arranged beside said conveyor wherein at least two of said sensors are positioned to detect the tops of said containers and at least one of said sensors is positioned to detect the bottoms of said containers when said containers are in an upright position;

a control system for determining whether said containers are down based on signals generated from said sensors; and an ejector to remove any fallen containers, said ejector being actuated by a signal from said control system.

2. The apparatus according to claim 1 wherein said sensors are optical sensors.

3. The apparatus according to claim 2 wherein said sensors are fiber optic sensors.

4. The apparatus according to claim 2 wherein said sensors comprise a radiant light source and a photocell.

5. The apparatus according to claim 1 wherein said sensors are sonic sensors.

6. The apparatus according to claim 1 wherein said sensors are pressure sensors.

7. The apparatus according to claim 1, wherein said ejector comprises an air nozzle directed toward said conveyor, said air nozzle being adapted to direct a jet of air toward a container on said conveyor to blow said container off said conveyor.

8. The apparatus according to claim 1 wherein said ejector comprises an arm, said arm being extendable transversely to said conveyor so as to push said container off said conveyor.

9. The apparatus according to claim 8 wherein said arm is moveably connected to a pneumatic cylinder.

10. The apparatus according to claim 8 wherein said arm is moveable connected to a hydraulic cylinder.

11. The apparatus according to claim 7 wherein said arm is actuated by an electromagnet.

12. The apparatus according to claim 1 further comprising a conveyor system adapted to move a plurality of containers.

13. The apparatus according to claim 1 wherein said containers are bottles.

14. The apparatus according to claim 1 wherein said containers are boxes.

15. A method for removing down containers on a conveyor line comprising the steps of:

moving a plurality of containers on a conveyor line, each of said containers having a top and a bottom;

detecting the presence or absence of the tops of said containers with at least two sensors;

detecting the bottoms of said containers with at least one sensor;

determining whether a container is in an upright or fallen position based on signals output from said sensors; and removing any fallen containers based on said determination.

16. The method according to claim 15 wherein said sensors are optical sensors.

17. The method according to claim 16 wherein said sensors are fiber optic sensors.

18. The method according to claim 16 wherein said sensors comprise a radiant light source and a photocell.

19. The method according to claim 15 wherein said sensors are sonic sensors.

20. The method according to claim 15 wherein said sensors are pressure sensors.

21. The method according to claim 15 wherein said fallen containers are removed by an ejector and said ejector comprises an air nozzle directed toward said conveyor said air nozzle directing a jet of air toward a container on said conveyor to blow said container off said conveyor.

22. The method according to claim 15 wherein said fallen containers are removed by an ejector and said ejector comprises an arm, said method further comprising extending said arm transversely to said conveyor to push said container off said conveyor.

23. The method according to claim 22 wherein said arm is moveably connected to a pneumatic cylinder.

24. The method according to claim 22 wherein said arm is moveable connected to a hydraulic cylinder.

25. The method according to claim 21 wherein said arm is actuated by an electromagnet.

26. The method according to claim 15 wherein said containers are bottles.

27. The method according to claim 15 wherein said containers are boxes.

28. The method according to claim 15, wherein said determination of whether a container is in an upright or fallen position is made without reference to time delay.

29. The apparatus according to claim 1, wherein said sensors detect the presence or absence of a container and said control system makes said determination without reference to time delay.

\* \* \* \* \*